(12) United States Patent
Oh

(10) Patent No.: US 10,676,039 B2
(45) Date of Patent: Jun. 9, 2020

(54) FRONT VIDEO CAMERA MODULE OF VEHICLE

(71) Applicant: LG ELECTRONICS INC., Seoul (KR)

(72) Inventor: Jaeheon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 15/004,068

(22) Filed: Jan. 22, 2016

(65) Prior Publication Data

US 2016/0224848 A1  Aug. 4, 2016

(30) Foreign Application Priority Data

Jan. 22, 2015  (KR) .................. 10-2015-0010637

(51) Int. Cl.
| | | |
|---|---|---|
| *G06K 9/00* | (2006.01) | |
| *B60R 11/04* | (2006.01) | |
| *H04N 5/225* | (2006.01) | |
| *B60R 1/00* | (2006.01) | |
| *B60R 11/00* | (2006.01) | |

(52) U.S. Cl.
CPC ................ *B60R 11/04* (2013.01); *B60R 1/00* (2013.01); *H04N 5/2251* (2013.01); *H04N 5/2257* (2013.01); *B60R 2011/0026* (2013.01); *B60R 2300/202* (2013.01)

(58) Field of Classification Search
CPC .. B60R 11/04; B60R 2300/202; H04N 5/2257
See application file for complete search history.

(56) References Cited

U.S. PATENT DOCUMENTS

| | | | | |
|---|---|---|---|---|
| 5,523,811 A | * | 6/1996 | Wada .................. | B60R 1/00 348/118 |
| 6,411,867 B1 | * | 6/2002 | Sakiyama ............ | B60Q 9/005 340/901 |
| 8,164,627 B1 | * | 4/2012 | Hahn ................... | B60R 1/00 348/148 |
| 2004/0034452 A1 | * | 2/2004 | Miller ................... | G02B 23/12 701/1 |

(Continued)

FOREIGN PATENT DOCUMENTS

| | | |
|---|---|---|
| CN | 102848976 | 1/2013 |
| CN | 102951089 | 3/2013 |

(Continued)

OTHER PUBLICATIONS

Chinese Office Action in Chinese Application No. 2015104409375, dated May 4, 2018, 9 pages.

*Primary Examiner* — Mainul Hasan
(74) *Attorney, Agent, or Firm* — Fish & Richardson P.C.

(57) ABSTRACT

A front video camera module for a vehicle includes a lens module having a lens that is configured to image a forward view of the vehicle, an image sensor that is configured to process the image received through the lens, and a lens case to which the lens and the image sensor are coupled. The front video camera module also includes a holder assembly that supports the lens module, the holder assembly being configured to attach to a front windshield of the vehicle via a windshield bracket, and a camera rotation assembly that is configured to rotate the lens module according to a sensed driving condition of the vehicle.

10 Claims, 14 Drawing Sheets

(56) References Cited

U.S. PATENT DOCUMENTS

| | | | | |
|---|---|---|---|---|
| 2004/0212484 A1* | 10/2004 | Su | ............................ | B60R 1/025 340/435 |
| 2009/0143967 A1* | 6/2009 | Lee | ............................ | B60R 1/00 701/119 |
| 2012/0127310 A1* | 5/2012 | Kim | ............................ | B60R 1/00 348/148 |

FOREIGN PATENT DOCUMENTS

| | | | |
|---|---|---|---|
| CN | 202923506 U | | 5/2013 |
| CN | 203267908 U | | 11/2013 |
| CN | 203793212 U | | 8/2014 |
| CN | 203996009 U | | 12/2014 |
| JP | 2007288444 A | * | 11/2007 |
| JP | 2009265412 | | 11/2009 |
| KR | 10-2011-0101607 | | 9/2011 |
| KR | 20-2012-0004072 U | | 6/2012 |

* cited by examiner

FRONT VIDEO CAMERA MODULE OF VEHICLE

CROSS-REFERENCE TO RELATED APPLICATION

This application claims the priority benefit of Korean Patent Application No. 10-2015-0010637, filed on Jan. 22, 2015, in the Korean Intellectual Property Office, the contents of which is incorporated by reference herein in its entirety.

FIELD

The present application relates to a front video camera module of a vehicle, and more particularly, to a front video camera module of a vehicle that can improve safety of the vehicle while driving and that can enhance driver convenience by variably rotating a lens module that images a forward view of the vehicle corresponding to a turning level of the vehicle.

BACKGROUND

In general, in a vehicle, to acquire accurate information about accidents and to prevent theft of valuables from the vehicle, a black box may be installed. Recently, going beyond mere information acquisition and theft prevention, research directed toward improving the driving safety of a vehicle by further enhancing its driving function, which is an intrinsic function of the vehicle, is being conducted.

For example, a camera device having various functions that can assist a driver achieve safe driving—by providing peripheral environment information of a driving vehicle to a driver by photographing the front side and the rear side of the vehicle as well as the left and right rear side of the vehicle while driving—may be provided.

However, in the interior space of the vehicle, particularly in the space in front of a driver where good visibility should be provided, the camera device along with a navigation device, an air freshener, and various other vehicle accessories may be mounted, thereby interfering with the visual field of the driver and rather obstructing safe driving.

In order to accurately detect obstacles in the driving direction of the vehicle, the camera device may be fixed to a vehicle body such that during a turning or cornering operation of the vehicle, the camera device may capture only a fixed front view regardless of the actual driving direction of the vehicle. Thus, when an obstacle suddenly appears on the road in the direction of a turn, the camera device may not be able to handle the situation appropriately.

SUMMARY

According to one aspect, a front video camera module for a vehicle includes a lens module having a lens that is configured to image a forward view of the vehicle, an image sensor that is configured to process the image received through the lens, and a lens case to which the lens and the image sensor are coupled. The front video camera module also includes a holder assembly that supports the lens module, the holder assembly being configured to attach to a front windshield of the vehicle via a windshield bracket, and a camera rotation assembly that is configured to rotate the lens module according to a sensed driving condition of the vehicle.

Implementations according to this aspect may include one or more of the following features. For example, the camera rotation assembly may be configured to rotate the holder assembly in a horizontal direction about a vertical axis. The camera rotation assembly may be configured to rotate the lens module relative to the holder assembly in a horizontal direction about a vertical axis. The lens module may include a pair of lens modules that are laterally separated by a predetermined distance in the holder assembly. In some cases, the camera rotation assembly may include an electric motion motor that is configured to be electrically driven, and a motor shaft that is configured to rotate based on driving of the electric motion motor, where the motor shaft defines a vertical axis about which the camera rotation assembly rotates the lens module. The electric motion motor may be fixed to one of the holder assembly or the windshield bracket, and the motor shaft may be correspondingly fixed to the other of the holder assembly or the windshield bracket. The electric motion motor may be fixed to one of the lens module or the windshield bracket, and the motor shaft may be correspondingly fixed to the other of the lens module or the windshield bracket.

In some implementations, the camera rotation assembly may be configured to rotate the lens module according to an estimated driving direction of the vehicle, the estimated driving direction being acquired based on driving information of the vehicle that is provided from a plurality of sensors configured to detect a driving state of the vehicle. The plurality of sensors may include a steering angle sensor that is configured to acquire steering angle information from a steering angle handle of the vehicle, a yaw rate sensor that is configured to acquire yaw rate information of the vehicle, an X-axis G sensor that is configured to acquire forward and reverse acceleration information of the vehicle, a Y-axis G sensor that is configured to acquire width direction acceleration information of the vehicle, and a vehicle speed sensor that is configured to acquire vehicle speed information of the vehicle. The camera rotation assembly may be configured to variably adjust a rotation angle of the lens module according to a driving speed of the vehicle. The camera rotation assembly may be configured to proportionally adjust a rotation angle of the lens module according to a driving speed of the vehicle. The camera rotation assembly may be configured to rotate, based on turning of the vehicle toward a driver side of the vehicle, the lens module by an angle at which at least an outer line of an opposing lane is imaged by the lens. The camera rotation assembly may be configured to rotate, based on turning of the vehicle toward a passenger side of the vehicle, the lens module by an angle at which an outside line on the passenger side of a lane occupied by the vehicle is imaged by the lens.

Additionally, the camera rotation assembly may be configured to rotate, based on turning of the vehicle toward a driver side of the vehicle, the lens modules by a first angle at which an outside line on a passenger side of a lane occupied by the vehicle is imaged by the lens, and may be configured to rotate, based on turning of the vehicle toward the passenger side of the vehicle, the lens module by a second angle at which an outside line on the driver side of the lane occupied by the vehicle is imaged by the lens. In some cases, the front video camera module may further include a switching unit that enables user selection of a rotation angle of the lens module that is performed by the camera rotation assembly. The camera rotation assembly may be configured to rotate the pair of lens modules about a rotation shaft of each of the pair of lens modules according to an estimated driving direction of the vehicle, the estimated driving direction being acquired based on information provided from a plurality of sensors that are configured to detect a driving state of the vehicle. Also, the image processed by the image sensor may be corrected in a calibration mode based on a phase difference between a first focusing distance between a first lens of one of the pair of lens modules and a detected object and a second focusing distance between a second lens of the other of the pair of lens modules and the detected object, the phase difference occurring based on the pair of lens modules rotating about the corresponding rotation shaft. The windshield bracket may be provided at an upper end portion of a center of the front windshield of the vehicle.

According to another aspect, a front video camera module for a vehicle includes a lens module that is configured to image a forward view of the vehicle, and a camera rotation assembly that is configured to rotate the lens module by a predetermined angle according to a turning direction of the vehicle, where the camera rotation assembly is configured to rotate the lens module in order to image a blind spot that extends from a line of sight of a driver to an A-pillar at a turning side of the vehicle.

Implementations according to this aspect may include one or more of the following features. For example, the front video camera module may further include a display unit that is configured to display an image captured by the lens module, wherein the image captured by the lens module through the display unit may be displayed in real time. The display unit may be provided in the A-Pillar and is configured to display captured images corresponding to the blind spot to the driver. In some cases, the front video camera module may further include a storage unit that is configured to store the image captured by the lens module, wherein the image captured by the lens module may be stored at the storage unit. Additionally, the front video camera module may further include an alarm unit that is configured to output a predetermined warning sound inside the vehicle, wherein the predetermined warning sound is output through the alarm unit during operation of the display unit.

DETAILED DESCRIPTION

Hereinafter, a front video camera module of a vehicle according to exemplary implementations will be described in detail with reference to the accompanying drawings.

Figure 1:
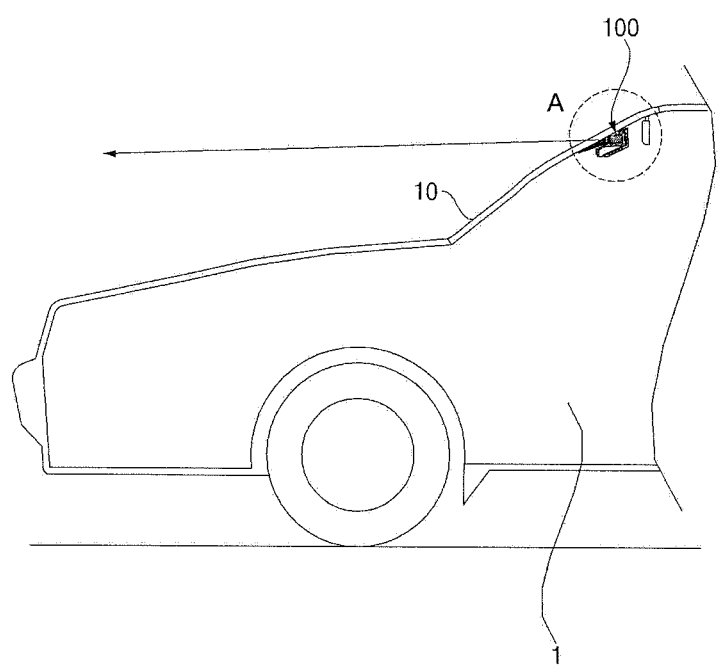
FIG. 1 is a side cross-sectional view of a vehicle body illustrating an example installation location of a front video camera module of a vehicle.
Figure 2:
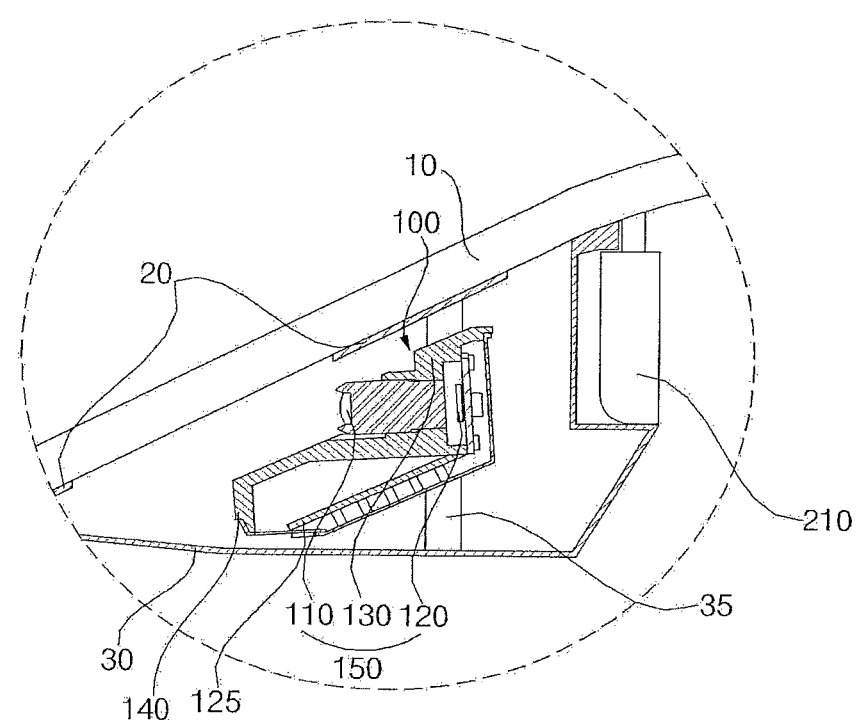
FIG. 2 is an enlarged view of portion A in FIG. 1.

As shown in FIGS. 1 and 2, a front video camera module 100 of a vehicle includes a lens module 150, which may include a lens 110 that converges a front image of the vehicle and an image sensor 120 that performs an image processing of the image converged through the lens 110, and a holder assembly 140 that couples the lens module 150 and mediates connection of the lens module 150 to a windshield bracket 20 provided in an upper end portion of the center of front windshield glass 10 of the vehicle.

The front windshield glass 10 may be an element that forms a front surface within a room of the vehicle and may be made of a transparent material to enable a driver to view a front driving direction of the vehicle.

The windshield bracket 20 may have a flat shape and thus an upper surface thereof may be securely attached to an inner surface of the front windshield glass 10 by, for example, an adhesive material and at a lower surface thereof, various connection portions that can connect the holder assembly 140 and an integral cover 30 may be include.

The windshield bracket 20 may be installed adjacent to an upper end portion of the center of the front windshield glass 10 and may perform a function of concealing the lens module 150 and the holder assembly 140 when viewed from the outside of the vehicle, except for a portion in which light converges as light passes through the lens 110.

When the windshield bracket 20 is an element that performs a function of concealing the lens module 150 and the holder assembly 140 at the outside of the vehicle, the integral cover 30 is an element that performs a function of concealing the lens module 150 and the holder assembly 140 from a passenger including a driver at the inside of the vehicle.

The integral cover 30 may define a space that houses the lens module 150 and the holder assembly 140 and in which the left side end and the right side end thereof can rotate to the front side and the rear side about a vertical axis C (FIGS. 3A-B and 4A-B). At the rear side of the integral cover 30, a rear view mirror 210 may be integrally coupled, or may be rotatably coupled so as to be angularly adjustable.

Inside of the integral cover 30, a support 35 that securely fixes the holder assembly 140 or that supports a rotation operation of the holder assembly 140 may be include. In the case when only the lens module 150 rotates, the support 35 may perform a function of fixing the holder assembly 140, and when the entire holder assembly 140 rotates, the support 35 may perform a function of supporting a rotation of the holder assembly 140.

The front video camera module 100 may be provided as a single type provided to converge a front image of a driving direction of the vehicle through the single lens 110 or may be provided as a stereo type that can three-dimensionally analyze by simultaneously converging one object existing within a focusing distance using a pair of lenses 110 are laterally separately by a predetermined distance.

The lens 110 converges light to the image sensor 120 by projecting light corresponding to a predetermined viewing angle coming from a front side of a driving direction. The image sensor 120 may be a charge coupling element (in which many light diode elements are integrated) that can generate an image based on light converged through the lens 110.

Inside of the holder assembly 140, an image processing board 125 that processes or stores a predetermined image generated by the image sensor 120 may be provided.

In some cases, three-dimensional state information may be immediately acquired by using a pair of lenses 110 to simultaneously identify an object located at a front focusing distance. However, the lens 110 is not limited to this configuration, and the lens 110 may be provided as a single type.

Figure 3A:
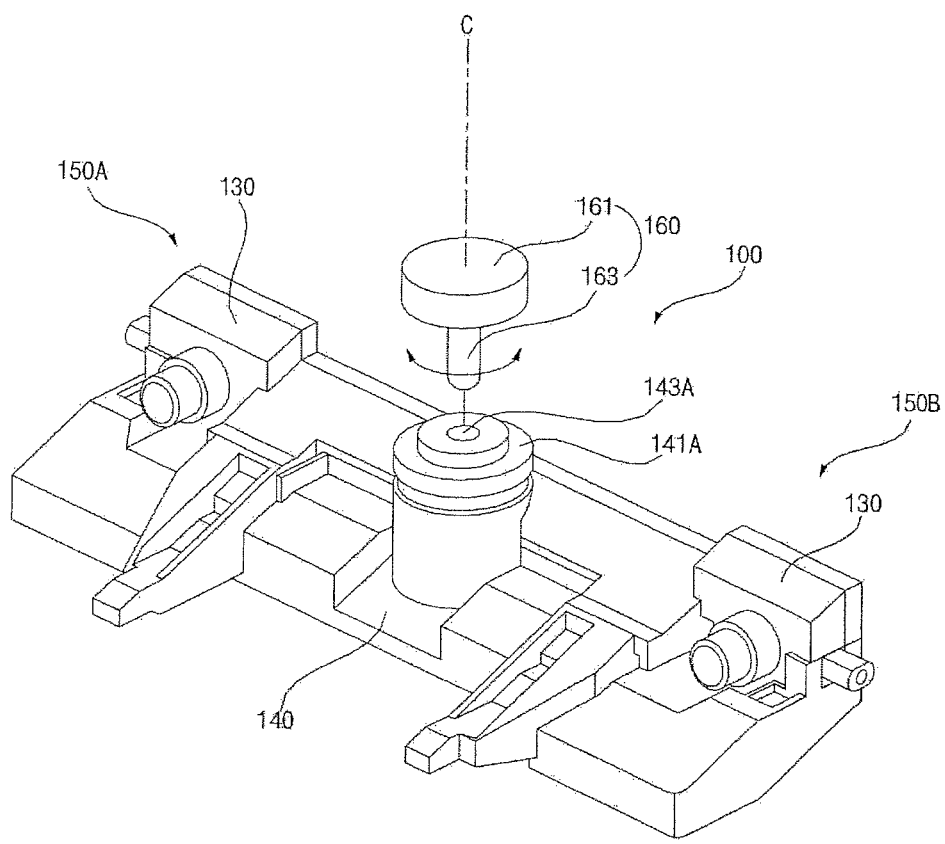
FIGS. 3A and 3B are exploded perspective views illustrating an example rotation of a holder assembly in a configuration of FIG. 1.
Figure 3B:
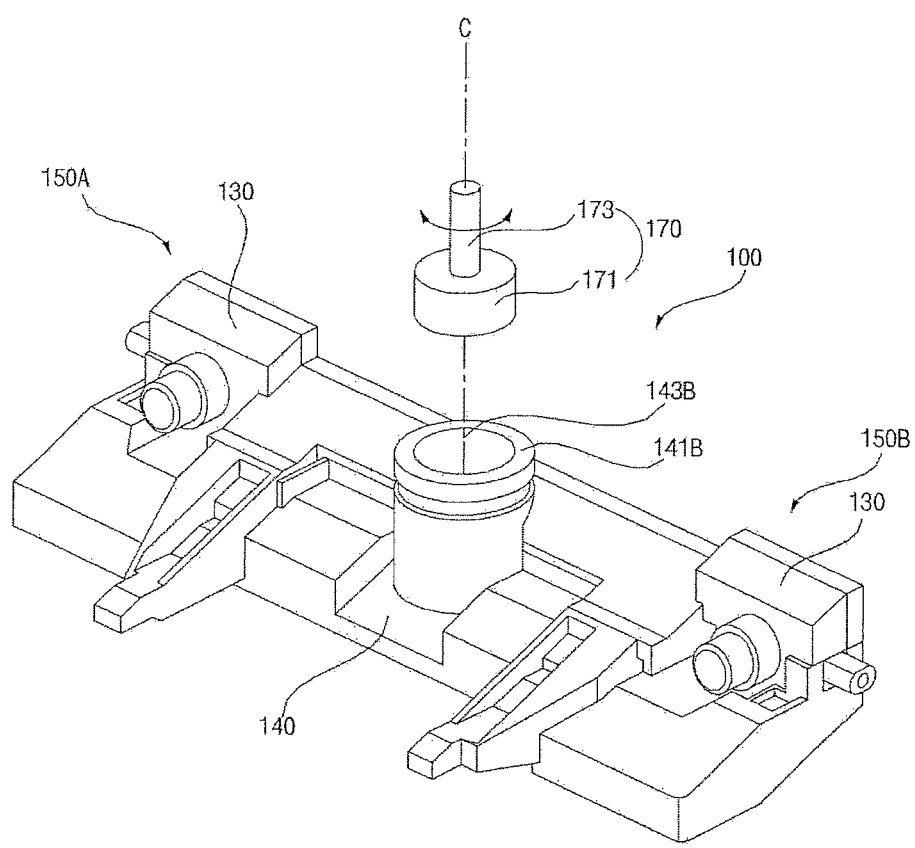
Figure 4A:
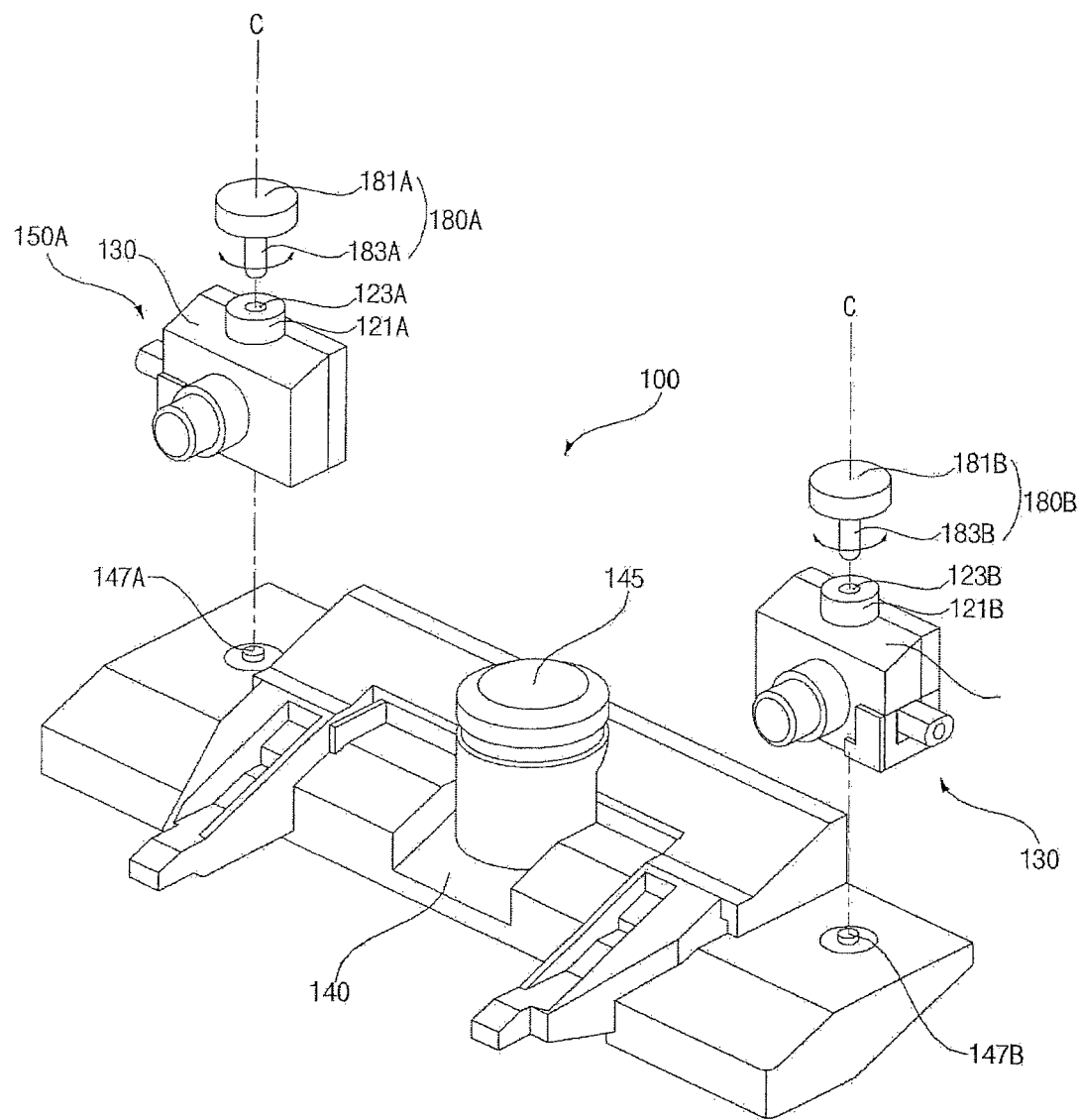
FIGS. 4A and 4B are exploded perspective views illustrating an example rotation of a lens module in a configuration of FIG. 1.
Figure 4B:
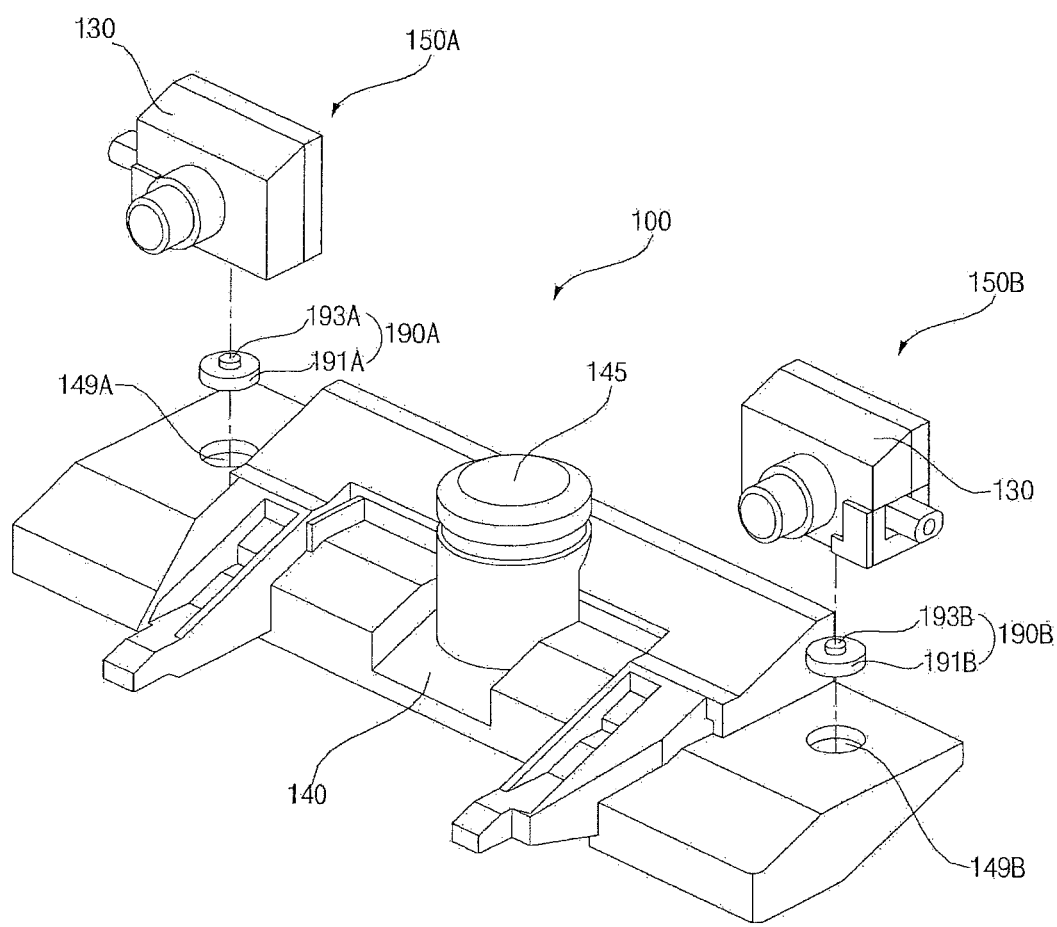

In FIGS. 3A and 3B, the holder assembly 140 is rotated, and in FIGS. 4A and 4B, the lens module 150 is rotated.

In some cases, the lens module 150 may be configured to rotate by a predetermined angle according to a turning level, or degree of turning, of the vehicle.

Here, a rotation of the lens module 150 may refer to both rotating the lens module 150 by rotating the holder assembly 140, which connects a pair of lens modules 150 including a pair of lenses 110 and a pair of image sensors 120, as well as individually rotating each of the pair of lens modules 150, each of which is formed as a unit comprising the image sensor 120 and the lens 110.

Example rotations of the lens module 150 are illustrated in FIGS. 3A, 3B, 4a, and 4B. Other configurations for rotating the lens modules 150 may be possible.

Referring to FIGS. 3A and 3B, a pair of lens cases 130, each of which forms a lens module 150 that includes the lens 110 and the image sensor 120, are fixed to the holder assembly 140. By rotating the holder assembly 140 about the vertical axis C, lens modules 150A and 150B can be rotated.

Referring to FIGS. 4A and 4B, a pair of lens cases 130, each of which includes the lens 110 and the image sensor 120, is individually rotatable in the holder assembly 140. By rotating each of the pair of lens cases 130 in a horizontal direction about the vertical axis C, the lens modules 150A and 150B can be rotated.

The front video camera module 100 may further include a camera rotation assembly having camera rotation structures 160, 170, 180, and 190 that help rotate the lens module 150 by a predetermined angle according to a turning level of the vehicle.

As shown in FIGS. 3A, 3B, 4A, and 4B, the camera rotation structures 160, 170, 180, and 190 may rotate the lens module 150 in a horizontal direction about the vertical axis C.

As described above, the camera rotation structures 160, 170, 180, and 190 may be implemented with operation of rotating the holder assembly 140 in which the pair of lens cases 130 are fixed and alternatively may be implemented with operation of rotating each of the pair of lens cases 130.

The camera rotation structures 160, 170, 180, and 190 may include electrically driven electric motion motors 161, 171, 181, and 191 and motor shafts 163, 173, 183, and 193 rotating according to driving of the electric motion motors 161, 171, 181, and 191. Here, the motor shafts 163, 173, 183, and 193 may define the vertical axis C to be the rotation center of the lens module 150. Further, the vertical axis C may be formed by a separate rotation shaft, and the motor shafts 163, 173, 183, and 193 may be provided to directly connect to said separate rotation shaft.

As shown in FIG. 3A, the electric motion motor 161 may be fixed to the windshield bracket 20, and the motor shaft 163 may be fixed to the holder assembly 140.

As shown in FIG. 3B, the electric motion motor 171 may be fixed to the holder assembly 140, and the motor shaft 173 may be fixed to the windshield bracket 20.

As shown in FIGS. 3A and 3B, in the holder assembly 140, a motor receiving hole 143B or a motor shaft receiving hole 143A in connection portions 141A and 141B may be defined to receive the electric motion motors 161 and 171 or the motor shafts 163 and 173. The motor receiving hole and the motor shaft receiving hole may be shaped to correspond to each other.

As the electric motion motors 161 and 171 and the motor shafts 163 and 173 are each provided to be fixed to the windshield bracket 20 or the holder assembly 140, when the electric motion motors 161 and 171 are driven according to power supply, the holder assembly 140 may rotate about the vertical axis C.

As shown in FIG. 4A, a pair of electric motion motors 181A and 181B disposed at a direct upper portion of a pair of lens cases 130 may be fixed to the windshield bracket 20, and respective motor shafts 183A and 183B of a pair of electric motion motors 181A and 181B may be fixed to each of a pair of lens cases 130. In a coupling portion of the holder assembly 140 to which each lens case 130 is coupled, a rotation protrusion 147 that supports a rotation of each lens case 130 may be formed to protrude upward, and each lens case 130 may be rotatably coupled to the rotation protrusion 147 and may be supported by the rotation protrusion 147. That is, in each lens case 130, a lower end portion thereof may be rotatably supported by the rotation protrusion 147 at an upper surface of the holder assembly 140, and an upper end portion thereof may be coupled to the windshield bracket 20 using the electric motion motors 181A and 181B and the motor shafts 183A and 183B as an intermediary. For this reason, in an upper end portion of the lens case 130, a motor shaft receiving hole 123A may be defined in a motor shaft coupling portion 121A for coupling to the motor shafts 183A and 183B, and in the windshield bracket 20, a motor receiving hole that houses the electric motion motors 181A and 181B may be defined.

As shown in FIG. 4B, a pair of electric motion motors 191A and 191B disposed at a direct lower portion of a pair of lens cases 130 may be fixed to the holder assembly 140, and respective motor shafts 193A and 193B of a pair of electric motion motors 191A and 191B may be fixed to a lower portion of each lens case 130. That is, the lens case 130 may be rotatably coupled to the holder assembly 140 using the electric motion motors 191A and 191B and the motor shafts 193A and 193B as an intermediary. For this reason, in the holder assembly 140, motor receiving holes 149A and 149B that house an electric motion motor may be defined, and in the lens case 130, a motor shaft receiving hole that houses the motor shafts 193A and 193B may be defined.

As the electric motion motors 191A and 191B and the motor shafts 193A and 193B are each provided between the windshield bracket 20 and the lens case 130 or between the lens case 130 and the holder assembly, when the electric motion motors 191A and 191B are driven according to power supply, the electric motion motors 191A and 191B may rotate the lens module 150 such that the lens case 130 rotates about the vertical axis C.

In the holder assembly 140, various fasten portions and a connection portion of the center thereof may be fixedly coupled to the windshield bracket 20 and the integral cover 30.

A camera rotation assembly having such a configuration can rotate the lens module 150 in an estimated driving direction of the vehicle based on driving information of the vehicle provided from a plurality of sensors that detect a driving state of the vehicle.

Here, a plurality of sensors may include a steering angle sensor that acquires steering angle information from a steering handle of the vehicle, a yaw rate sensor that acquires yaw rate information of the vehicle, an X-axis G sensor, or accelerometer, that acquires forward and reverse acceleration information of the vehicle, a Y-axis G sensor, or accelerometer, that acquires width direction acceleration information of the vehicle, and a vehicle speed sensor that acquires vehicle speed information of the vehicle.

Any sensor that is not described but that can additionally acquire driving information of the vehicle may be included in the plurality of sensors. For example, satellite information provided from a Global Positioning System (GPS) may be also included.

Figure 5A:
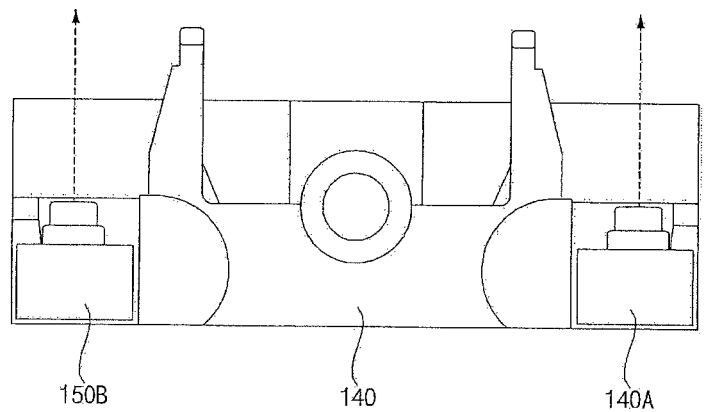
FIGS. 5A and 5B are top plan views illustrating example configurations of the lens module before and after rotation, respectively.
Figure 5B:
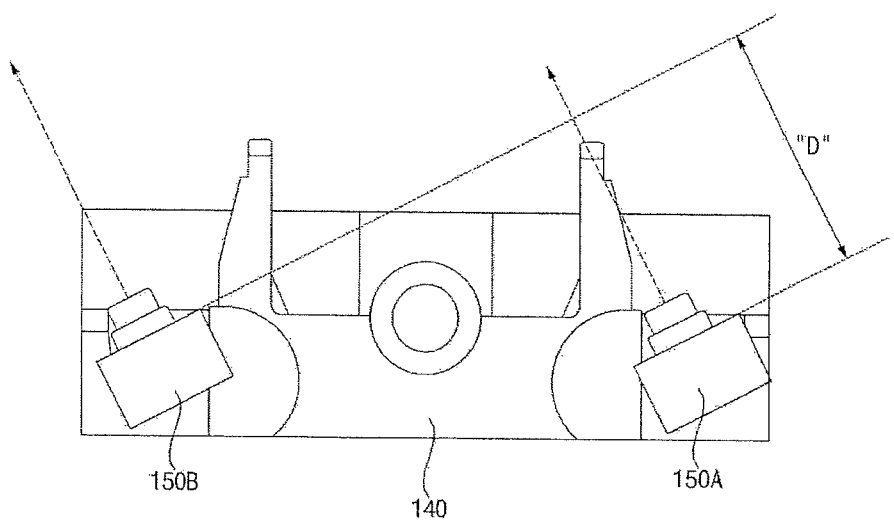

Referring now to FIG. 5A, in a rotation operation of the lens module 150 as seen in FIGS. 3A and 3B, because the pair of lens modules 150 simultaneously rotate along with the holder assembly 140, an image generated by the image sensor 120 after being converged to each lens 110 contains the same three-dimensional information. Accordingly, processing through the image processing board 125 may be performed without making any adjustments. However, as shown in FIG. 5B, in a rotation operation of the lens module as seen in FIGS. 4A and 4B, because each lens case 130 rotates while the holder assembly 140 remains stationary, a phase difference D can occur along a focusing distance of one side lens 110 and the other side lens 110 to the same object. Therefore, when the image processing board 125 processes an image generated by the image sensor 120, such a phase difference D can lead to different three-dimensional state information, which may require further adjustments to be made to the image processing.

While the camera rotation assembly rotates a pair of lens modules 150 about each rotation shaft in an estimated driving direction of the vehicle based on information provided from the plurality of sensors that detect a driving state of the vehicle, it may be preferable for an image generated by the image sensor 120 to be corrected in a calibration mode in consideration of the phase difference D that occurs when a pair of lens modules 150 rotate about each rotation shaft.

A calibration mode may be internal execution algorithm of the front video camera module 100 that enables acquisition of an image processed by the image processing board 125 and accurate three-dimensional information data about an object within a focusing distance by adding different preset correction values according to a rotation angle of the lens case 130.

In some cases, the camera rotation assembly may be configured to variably adjust a rotation angle of the lens module 150 according to a driving speed of the vehicle. That is, the camera rotation assembly may adjust a rotation angle of the lens module 150 proportionally to a driving speed of the vehicle.

When the vehicle performs a turning operation at high speed, a view angle to be shot by the camera module 100 may need to be relatively quickly changed toward a turning direction and thus it may be necessary to increase a rotation angle of the lens module 150. When the vehicle performs a turning operation at low speed, a view angle to be shot by the camera module may need to be relatively slowly changed toward a turning direction and thus it may be necessary to decrease a rotation angle of the lens module 150. However, it may be unnecessary to adjust a rotation angle of the lens module 150 by the camera rotation assembly. Rather, a rotation angle may be set according to a predetermined setting angle, while a rotation speed of the lens module 150 may be alternatively, or additionally, adjusted according to a driving speed of the vehicle.

In general, vehicles may be classified into a Left Hand Drive (LHD) type vehicle in which a driver seat is provided at the left side and in which a passenger seat is provided at the right and a Right Hand Drive (RHD) type vehicle in which a driver seat is provided at the right side and in which a passenger seat is provided at the left side. LHD type vehicles are typically driven on the right hand side of the road while RHD type vehicles are typically driven on left hand side of the road, with each country typically deciding on which side of the road vehicles should be driven.

For clarity in understanding, the front video camera module 100 of the vehicle is described based on right hand side driving using an LHD type vehicle. However, the present disclosure is not limited to the LHD type vehicle and further encompasses RHD type vehicles driving on the left hand side of the road.

Figure 6A:
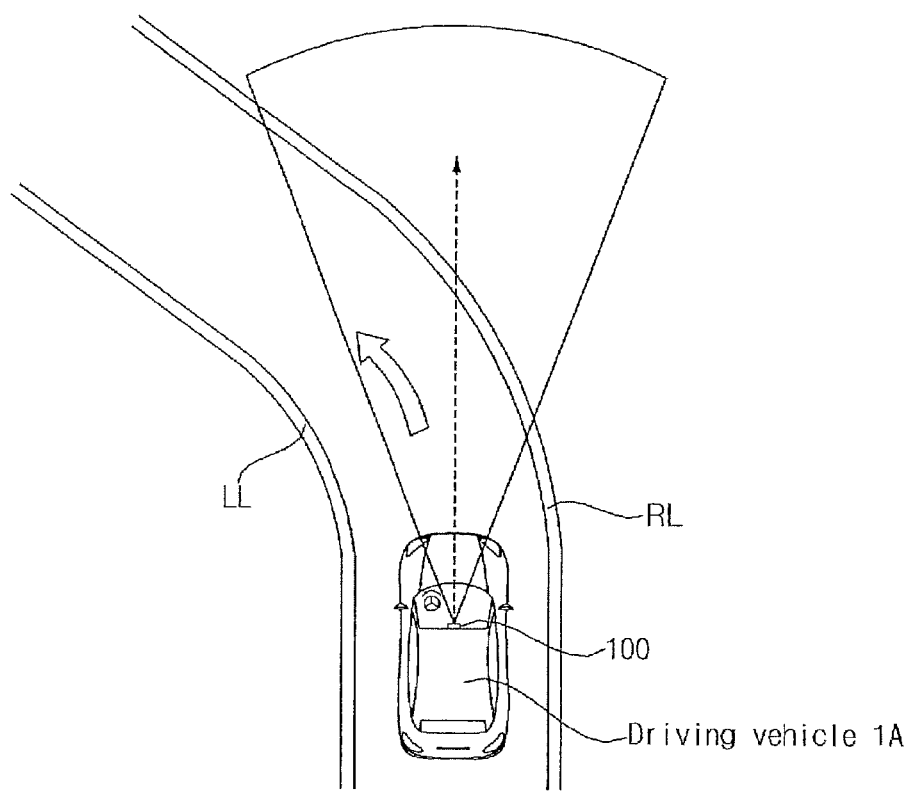
FIGS. 6A and 6B are conceptual diagrams illustrating example configurations of the camera module before and after rotation, respectively, during a turning operation of the vehicle toward the driver side.
Figure 6B:
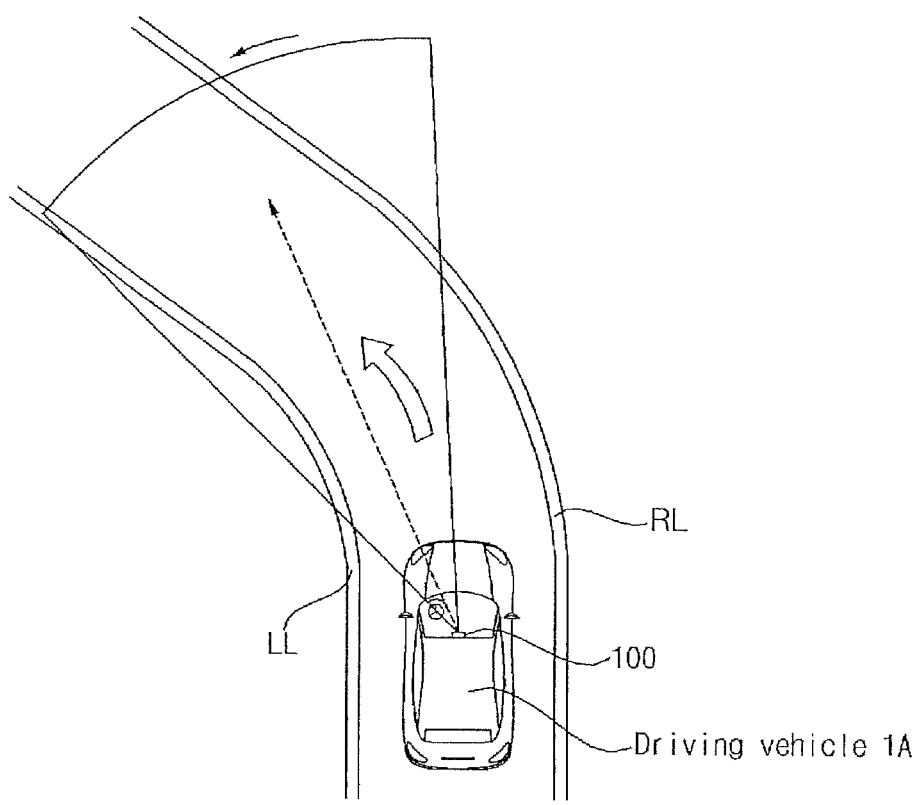

Referring to the FIGS. 6A and 6B, in the front video camera module, the camera rotation structures 160, 170, 180, and 190 change an angle that is shot by the camera module 100 by rotating the lens module 150 by a predetermined angle toward a driving direction when performing a turning operation, as shown in FIG. 6B. When the vehicle performs straight driving, as shown in FIG. 6A, the front side of the vehicle is shot through the lens module 150.

This may be referred to as a general rotation mode that is implemented by rotating the lens module 150 by a setting angle without distinction of whether the vehicle is engaging in a driver seat direction turning operation or a passenger seat direction turning operation. Driver seat direction turning operation indicates that the vehicle is being turned toward the side at which a driver seat is located, and passenger seat direction turning operation indicates that the vehicle is being turned toward the side at which a passenger seat is located.

In one implementation, in driver seat direction turning operation and passenger seat direction turning operation, a general rotation mode is implemented by rotating the lens module 150 by an angle in which an outermost line of a turning direction of at least a lane in which the vehicle occupies while driving converges to the lens 110. In this case, a maximum rotation angle of the lens module 150 may be an angle in which the above-described lane converges within a focusing distance of a pair of lens 110.

Here, as shown in FIGS. 6A and 6B, the lane may refer to a space between a Left Line (LL) and a Right Line (RL) in which the vehicle occupies while driving, may refer to the above-described RL itself, or, in a road made up of two or more lanes, may refer to the right side lane that a driving vehicle 1A is occupying. The same concept regarding the lanes may be equally applied to the LL. In a two-lane, two-way road, a Drive Left Line (DLL) at a driver seat direction turning side of the driving vehicle 1A and a Counter Left Line (CLL) at a driver seat direction turning driving side of an opposite vehicle 1B may each be a Center Line (CL) (See FIG. 8A). In contrast, in a two-lane, two-way road, when a shoulder line exists, a Drive Right Line (DRL) at a passenger seat direction turning side of the driving vehicle 1A and a Counter Right Line (CRL) a passenger seat direction turning side of the opposite vehicle 1B may be a shoulder line.

In this way, during a turning operation of the vehicle according to a general rotation mode, by enabling imaging of at least the lane that the driving vehicle 1A occupies regardless of the opposite vehicle 1B driving in an opposite direction, particularly in the daytime, the front video camera module may not unnecessarily image the straight front side view of the vehicle when turning or the opposite driving direction that the opposite vehicle 1B occupies.

The front video camera module may be provided to rotate the lens module, during a driver seat direction turning operation, by an angle in which an outside line on the passenger seat direction of the lane that the vehicle occupies while driving is converged to a lens based on a focal distance of the lens. Additionally, the front video camera module may be provided to rotate the lens module, during a passenger seat direction turning operation, by an angle in which an inner line on the driver seat direction of the lane that the vehicle occupies while driving is converged to a lens based on a focal distance of the lens.

Figure 7A:
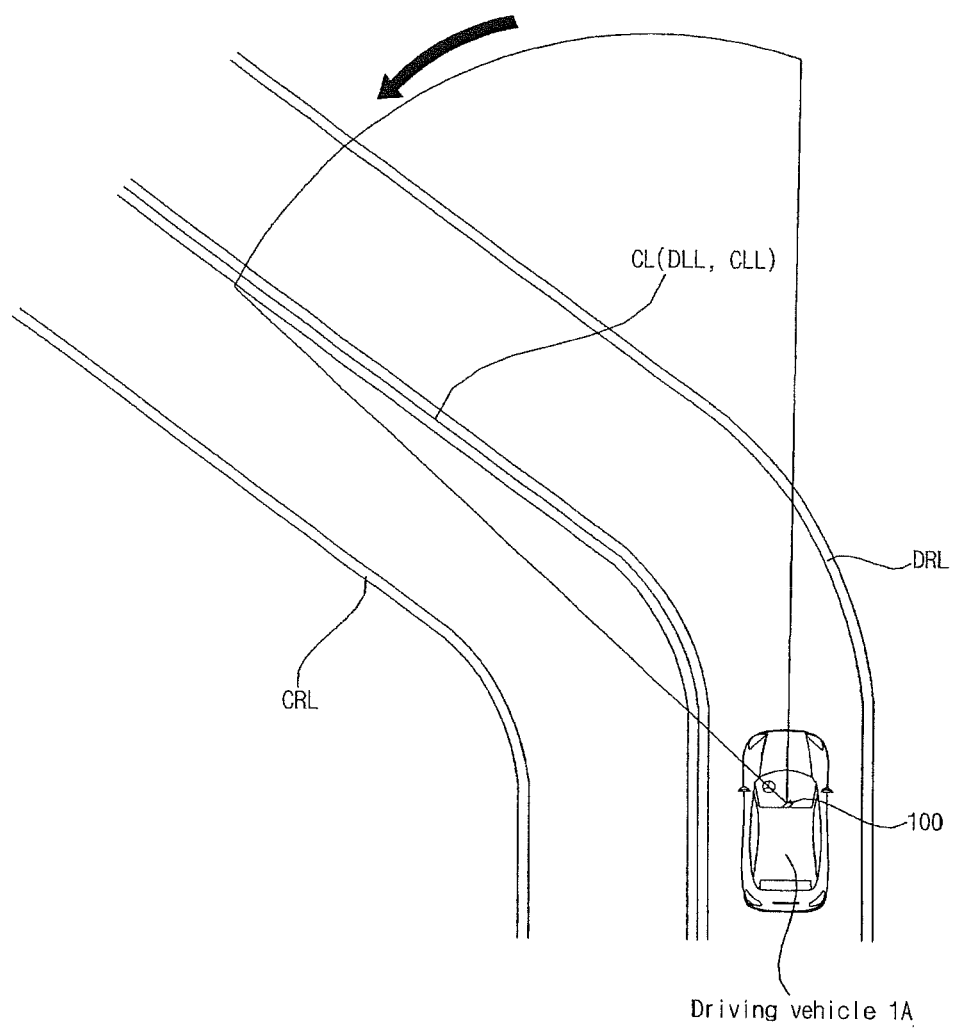
FIGS. 7A and 7B are top plan views illustrating example configurations of a front camera module during a turning operation of the vehicle toward the driver side and the passenger side, respectively.

That is, as shown in FIG. 7A, during a driver seat direction turning operation, an outermost line of the occupied lane on the passenger seat side leads to rotation of the lens module 150 within the limitation of a centerline (CL). In this case, it may be preferable that a limitation of a rotation angle of the lens module 150 is within a focal distance of each lens 110 and is set to an angle that converges to the lens 110.

Figure 7B:
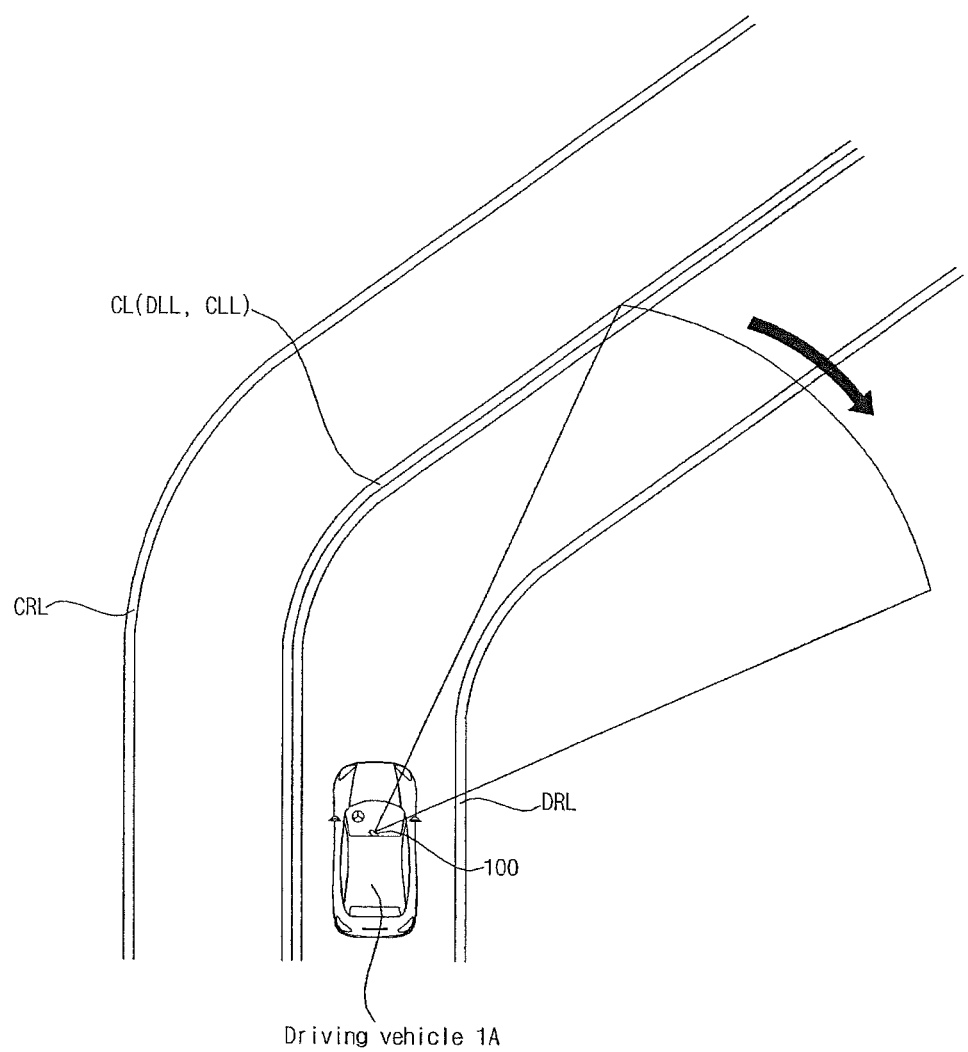

Similarly, as shown in FIG. 7B, during a passenger seat direction turning operation, an outermost line of the occupied lane on the driver seat side leads to rotation of the lens module 150 within the limitation of a centerline (CL).

However, when turning toward the left side during night driving of the vehicle, the driver may be affected by a glare coming from the light of the opposite vehicle 1B, and when turning toward the right side, wild animals may suddenly appear from a shoulder.

Therefore, regarding turning operation of the vehicle at night, example rotations of the lens module 150 will be described separately for the case of driver seat direction turning operation and passenger seat direction turning operation.

Figure 8A:
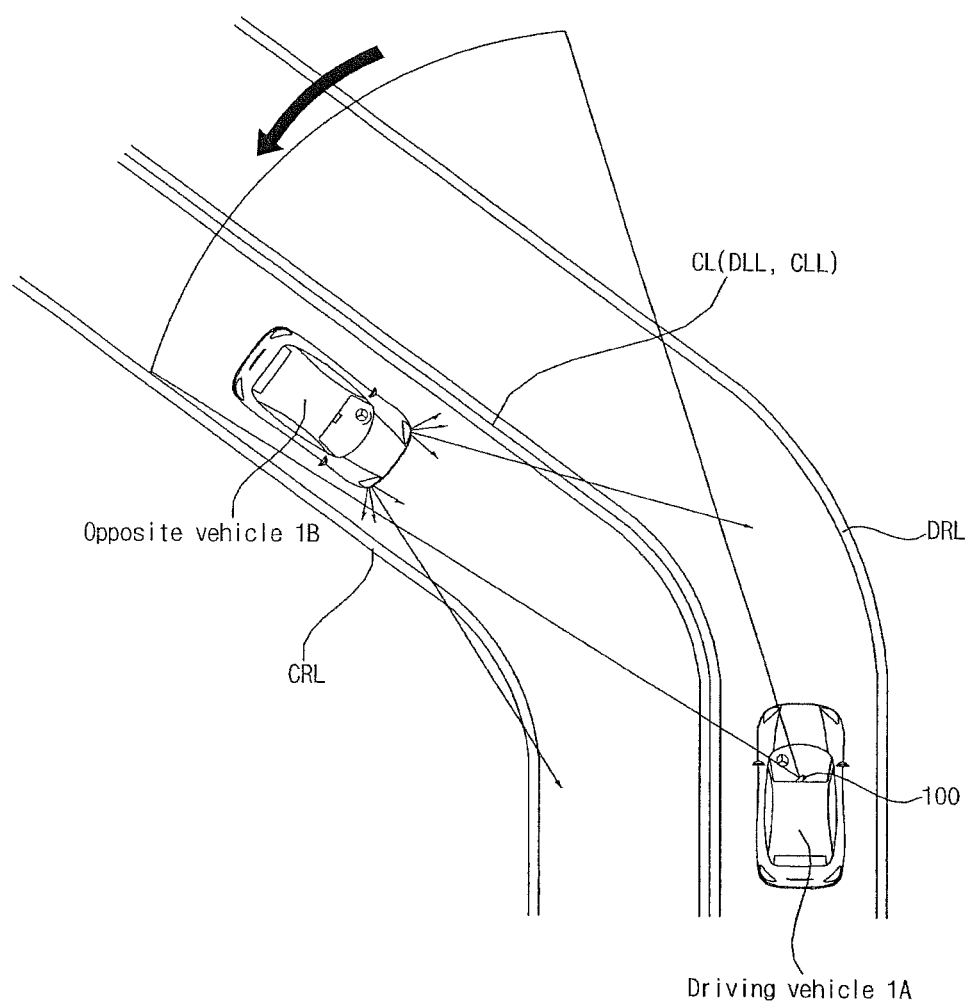
FIGS. 8A and 8B are conceptual diagrams illustrating example configurations of a camera module during a turning operation of the vehicle toward the driver side and the passenger side, respectively, at night.

As shown in FIG. 8A, during driver seat direction turning operation at night, the camera rotation structures 160, 170, 180, and 190 may be operated to rotate the lens module 150 by an angle in which at least a Counter Right Line (CRL) of driving lanes of an opposite direction is converged to the lens 110. This can help prevent accidents due to glare coming from the light of the opposite vehicle 1B, and can be used to promote safe driving via replacement using a display unit (reference numeral 400 of FIG. 9) to be described later that is provided to output an image captured by the camera module 100. In some cases, the CRL may refer to the outermost CRL.

Figure 8B:
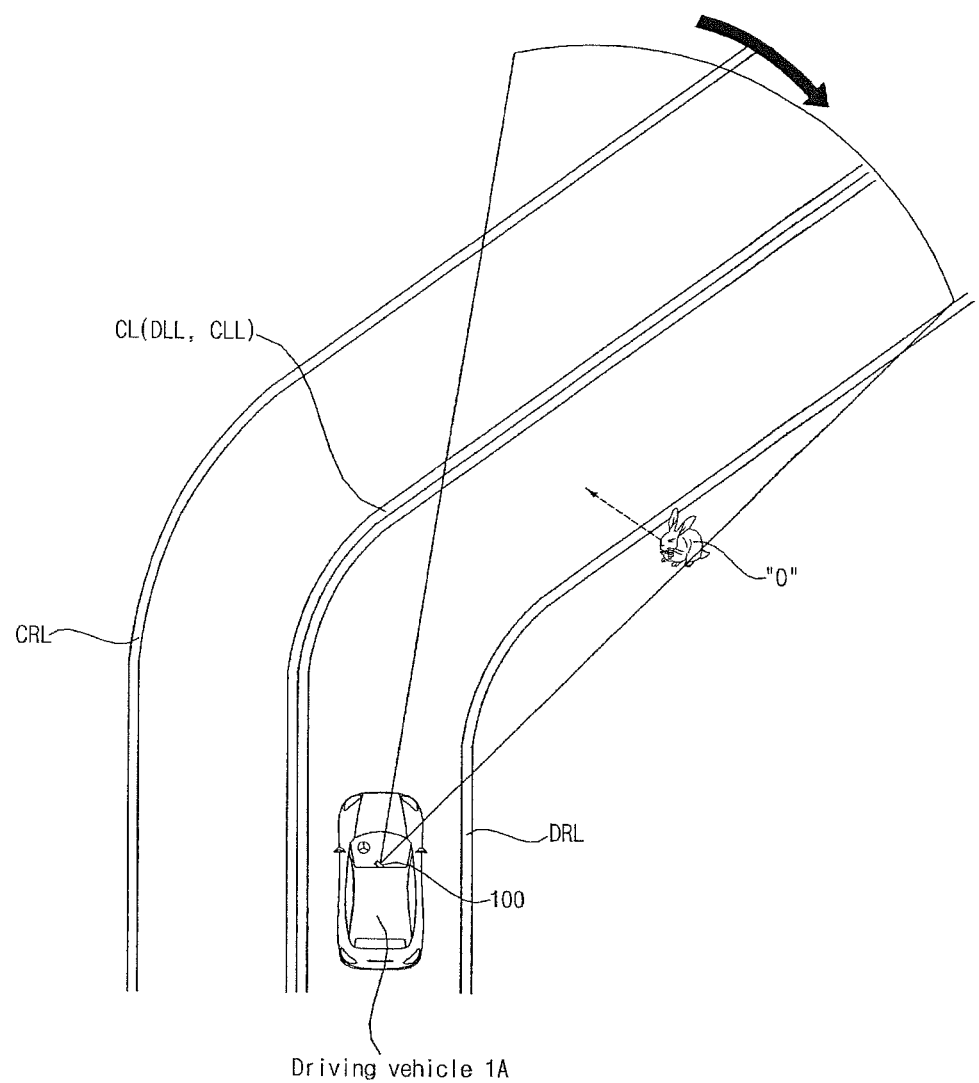

As shown in FIG. 8B, the camera rotation structures 160, 170, 180, and 190 may be operated to rotate the lens module 150 by an angle in which a DRL at a turning direction of at least a lane that the vehicle occupies while driving is converged to the lens 110 during passenger seat direction turning operation at night. In this case, as described above, it may be preferable that a DRL of a turning direction of a line in which the vehicle occupies while driving is analyzed as a shoulder line.

The above-described rotation configurations of the lens module 150 during the day or during the night may be selectively implemented by a user selection. That is, the front video camera module 100 may rotate the lens module 150 in a turning direction of the vehicle and may rotate the lens module 150 by a common setting angle regardless of whether driving during the day or night. As described above, such a rotating configuration of the lens module 150 may be referred to as a general rotation mode.

To enable such user selection, the front video camera module 100 may further include a switching unit that enables the user to select a rotation angle of the camera rotation assembly according to whether driving during the day or night.

Further, the switching unit may perform switching to a general rotation mode that rotates by the above-described setting angle without distinguishing between driving during the day or night.

Figure 9:
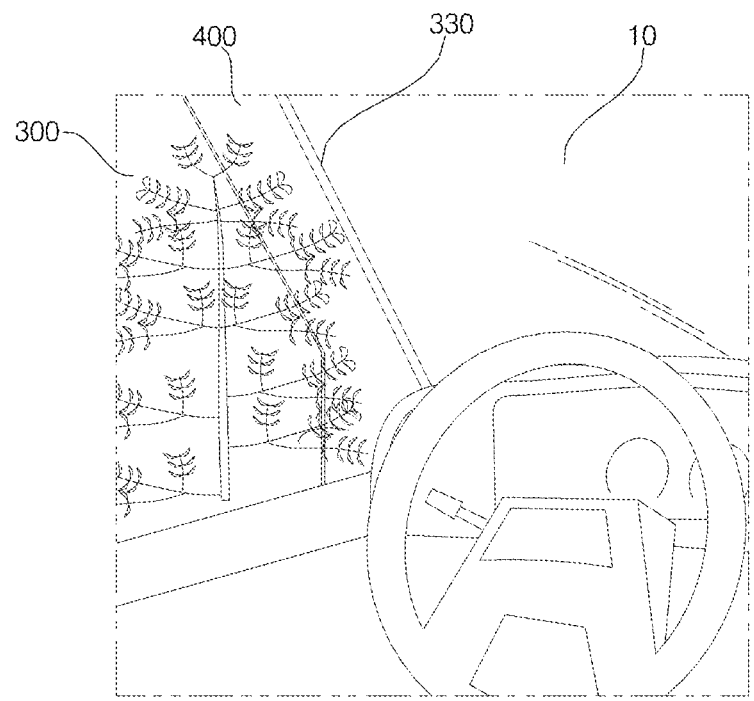
FIG. 9 is a perspective view illustrating an example of a display unit.

Referring to FIG. 9, the front video camera module 100 of a may further include a display unit 400 that displays an image captured by the lens module 150 and a storage unit that stores an image captured by the lens module 150.

The display unit 400 may be a monitor installed at the vehicle and may be a wireless communication terminal that can be detachably mounted in the vehicle and that can be interlocked with an internal system of the vehicle and includes a hologram device or other display devices that can display a real time image and a stored image or a recorded image processed through the image processing board 125.

The display unit 400 may display an image captured by the lens module 150 in real time through the display unit 400 and may display an image stored at a storage unit according to a user selection.

In order to capture the front side of a straight line (hereinafter, referred to as a "driving visual field blind spot") that connects a line of sight of a driver and an A-Pillar 330 adjacent to a turning direction of the vehicle, the camera rotation assembly may rotate the lens module 150.

Here, the display unit 400 may display a driving visual field blind spot captured by the lens module 150 to a driver and a passenger.

Further, as shown in FIG. 9, the display unit 400 may be provided at the A-Pillar 330 of an inner side surface of the vehicle room in a shape corresponding to that of the A-Pillar 330 and may display the driving visual field blind spot to the driver to completely remove the driving visual field blind spot of the driver.

As described above, the lens module 150 may capture the front side of a driving direction of the vehicle and acquire three-dimensional state information of a driving obstacle (hereinafter, referred to as an "obstacle") existing on a front side driving road converged through the single lens 110 or a pair of lenses 110, thereby performing a function of enabling a driver and a passenger to recognize a dangerous situation and enabling investigation of an accurate accident cause even after a safety accident occurs.

The display unit 400 may be set to always display an image captured by the lens module 150 while the engine operates or while the vehicle drives, and in order for a driver or a passenger to be enabled to more easily recognize appearance of an obstacle, only when it is determined that an obstacle exists within an image captured by the lens module 150, the display unit 400 may display the image.

Further, the front video camera module 100 may further includes an alarm unit that emits a predetermined warning sound to a vehicle room, and when it is determined that an obstacle exists within an image captured by the lens module 150, by emitting a predetermined warning sound through the alarm unit while operating the display unit 400, the alarm unit may enable a driver and a passenger to more easily recognize an obstacle.

Reference numeral 300 designates a window glass of a side door.

While the present disclosure has been shown and described with reference to various examples thereof, it will be understood by those skilled in the art that changes in form and details may be made therein without departing from the spirit and scope of the disclosure as defined by the appended claims.

What is claimed is:

1. A front video camera module for a vehicle, comprising:
a lens module comprising a lens that is configured to image a forward view of the vehicle, an image sensor that is configured to process an image received through the lens, and a lens case to which the lens and the image sensor are coupled;
a holder assembly comprising a coupling portion configured to couple the lens module to a front windshield of the vehicle via a windshield bracket, the windshield bracket being configured to be attached to an inner surface of the front windshield of the vehicle; and
a camera rotation assembly comprising an electric motion motor configured to be electrically driven and a motor shaft configured to rotate based on driving of the electric motion motor, the camera rotation assembly being configured to rotate the lens module according to a sensed driving condition of the vehicle,
wherein the camera rotation assembly is further configured to:
based on turning of the vehicle toward a driver side of the vehicle, rotate the lens module by a first angle at which a first outside line on a passenger side of an opposing lane is imaged by the lens, the opposing lane being opposite to a lane occupied by the vehicle,
based on turning of the vehicle toward a passenger side of the vehicle, rotate the lens module by a second angle at which a second outside line on a passenger side of the lane occupied by the vehicle is imaged by the lens, and
rotate the lens module according to an estimated driving direction of the vehicle, the estimated driving direction being acquired based on driving information of the vehicle that is provided from a plurality of sensors configured to detect a driving state of the vehicle.

2. The front video camera module of claim 1, wherein the plurality of sensors comprise a steering angle sensor that is configured to acquire steering angle information from a steering angle handle of the vehicle, a yaw rate sensor that is configured to acquire yaw rate information of the vehicle, an X-axis G sensor that is configured to acquire forward and reverse acceleration information of the vehicle, a Y-axis G sensor that is configured to acquire width direction acceleration information of the vehicle, and a vehicle speed sensor that is configured to acquire vehicle speed information of the vehicle.

3. The front video camera module of claim 1, wherein the camera rotation assembly is configured to variably adjust a rotation angle of the lens module according to a driving speed of the vehicle.

4. The front video camera module of claim 1, wherein the camera rotation assembly is configured to proportionally adjust a rotation angle of the lens module according to a driving speed of the vehicle.

5. The front video camera module of claim 1, wherein the camera rotation assembly is configured to rotate, based on turning of the vehicle toward the driver side of the vehicle, the lens module by the first angle at which the second outside line on the passenger side of the lane occupied by the vehicle is imaged by the lens, and is configured to rotate, based on turning of the vehicle toward the passenger side of the vehicle, the lens module by the second angle at which an inside line on the driver side of the lane occupied by the vehicle is imaged by the lens.

6. The front video camera module of claim 1, wherein the camera rotation assembly is configured to rotate the lens module in order to image a blind spot that extends from a line of sight of a driver to an A-pillar at a turning side of the vehicle.

7. The front video camera module of claim 6, further comprising a display unit that is configured to display an image captured by the lens module,
wherein the image captured by the lens module through the display unit is displayed in real time.

8. The front video camera module of claim 7, wherein the display unit is provided in the A-Pillar and is configured to display captured images corresponding to the blind spot to the driver.

9. The front video camera module of claim 7, further comprising a storage unit that is configured to store the image captured by the lens module,
wherein the image captured by the lens module is stored at the storage unit.

10. The front video camera module of claim 7, further comprising an alarm unit that is configured to output a predetermined warning sound inside the vehicle, wherein the predetermined warning sound is output through the alarm unit during operation of the display unit.

* * * * *